(12) United States Patent  
Wei Lin

(10) Patent No.: US 7,918,471 B2  
(45) Date of Patent: Apr. 5, 2011

(54) BICYCLE FRAME

(75) Inventor: Shu Wei Lin, Mallabia (ES)

(73) Assignee: Orbea, S. Coop. Ltda., Mallabia (Bizcaia) (ES)

( * ) Notice: Subject to any disclaimer, the term of this patent is extended or adjusted under 35 U.S.C. 154(b) by 150 days.

(21) Appl. No.: 11/997,075

(22) PCT Filed: Jun. 20, 2006

(86) PCT No.: PCT/ES2006/000361  
§ 371 (c)(1),  
(2), (4) Date: Jan. 28, 2008

(87) PCT Pub. No.: WO2007/017532  
PCT Pub. Date: Feb. 15, 2007

(65) Prior Publication Data  
US 2008/0197603 A1 Aug. 21, 2008

(30) Foreign Application Priority Data  
Jul. 29, 2005 (ES) .................................. 200501871

(51) Int. Cl.  
*B62K 3/02* (2006.01)

(52) U.S. Cl. .................................................... 280/281.1

(58) Field of Classification Search ............... 280/281.1, 280/288.3  
See application file for complete search history.

(56) References Cited

U.S. PATENT DOCUMENTS

| 4,513,986 A * | 4/1985 | Trimble ..................... 280/288.3 |
| 4,850,607 A | 7/1989 | Trimble et al. |
| 5,019,312 A | 5/1991 | Bishop |
| 2002/0033586 A1 | 3/2002 | Vroomen et al. |
| 2004/0046352 A1 | 3/2004 | Vroomen et al. |

FOREIGN PATENT DOCUMENTS

| DE | 29601234 X | 3/1996 |
| EP | 0832813 | 4/1998 |
| ES | 211793 X | 9/1976 |
| ES | 2051623 X | 6/1994 |
| WO | 9528314 | 10/1995 |
| WO | 9854046 X | 12/1998 |
| WO | 9911511 | 3/1999 |
| WO | 0056593 | 9/2000 |

\* cited by examiner

*Primary Examiner* — Kevin Hurley  
(74) *Attorney, Agent, or Firm* — Lucas & Mercanti, LLP

(57) ABSTRACT

Bicycle frame, which consists of a rear triangle (t) joined to a front quadrilateral (c) of tubular elements, with a common coupling element (A) for the two, which is joined at the upper part with an upper tube (4) and the rear triangle (t) consisting of upper braces (3), lower braces (7) and the sealing element (2), which is curved and covers the back wheel of the bicycle, and the shaft (e2) of the coupling element(A) being approximately coplanar with the shaft of the upper braces (3) forming a comfort angle ($\alpha$) with respect to the shaft of the upper tube (4) of equal value to or greater than 120°: $\alpha > 120°$.

2 Claims, 3 Drawing Sheets

BICYCLE FRAME

The object of the invention is a new bicycle frame.

There are numerous Patents in existence relating to bicycle frames, which form a part of the current state of the technique, some examples being, among many other files, WO056593, WO9911511, WO9528314, EP0832813; they deal with improving aerodynamics and/or stability, as well as achieving maximum performance from the efforts of the cyclist.

In this line and in recent technology, Patents US2002/0033586 and US2004/0046352 refer to bicycle frames in which part of a tubular of the frame covers part of the rear wheel, to improve the aerodynamics.

Problems and disadvantages of this structuring are, among others:

The saddle tube, being straight and vertical is not aligned with respect to the pedal shaft, which drastically diminishes efficiency during pedalling and transmission of the joint forces of the cyclist and the bicycle.

Three welded tubes converge at the same point, which causes excessive concentration of tensions which can cause catastrophic breakage, particularly when it is a zone where strong forces converge, as they support the weight of the cyclist and his force while pedalling.

Excessively rigid and uncomfortable configuration. The concept of comfort angle does not exist.

The object of the invention is a new bicycle frame, which consists of a rear triangle joined to a front quadrilateral of tubular elements, the front quadrilateral consisting of a head tube to which an approximately horizontal upper tube and a slanted lower tube are joined; a sealing element which is joined at the lower part to the lower tube and to place the pedals above a coupling element, which joins above to an upper tube and the rear triangle consisting of upper braces, lower braces and the sealing element, which is curved and covers the rear wheel of the bicycle, and the shaft of the coupling element being approximately coplanar with the shaft of the upper braces, forming an angle ($\alpha$) with respect to the shaft of the upper tube equal to or of greater value than 120°: $\alpha \geq 120°$.

In the zone of union of the coupling element with the upper tube, there is a saddle tube with a shaft which passes through the centre of the pedals.

It is specifically a single-block composite bicycle frame which solves the problem of concentration of tensions. Moreover:

The saddle tube is aligned with the centre of the pedals shaft, which allows full and maximal transmission of pedalling force, maximizing the performance of the combined cyclist-bicycle.

There are three clearly differentiated portions of tube which make up, together with the rest of the front triangle, a single piece (single (monocoque construction), manufactured in carbon-compound material, which considerably reduces the risk of catastrophic breakage in the zone of the saddle joint, as there no longer exist encounters between tubes nor weld beads which weaken the structure and concentrate tensions. Therefore, it can be affirmed that it is a more solid and lasting construction that those currently known.

There is a comfort angle ($\alpha$) formed between the shaft ($e_2$) of the coupling element (A) and the shaft ($e_3$) of the upper tube of the frame.

There is a coupling angle ($\beta$) formed between the shaft ($e_2$) of the coupling element (A) and the straight line, which joins the centre of the pedals with the intersection point between said shaft ($e_2$) and the internal arc of the sealing element.

These angles ($\alpha$), ($\beta$) improve and increase the comfort of the cyclist during pedalling, allowing a certain degree of bending and absorption of vibrations. Both angles ($\alpha$), ($\beta$) can vary preferably about 5° from the smallest to the largest size to maintain the ratio of rigidity-damping-absorption of vibrations constant, and independent from the weight and size of the cyclist.

To better understand the object of this invention, a preferable form of practical implementation is illustrated in the plans, subject to accessory changes which will not affect their basis.

Figure 1:
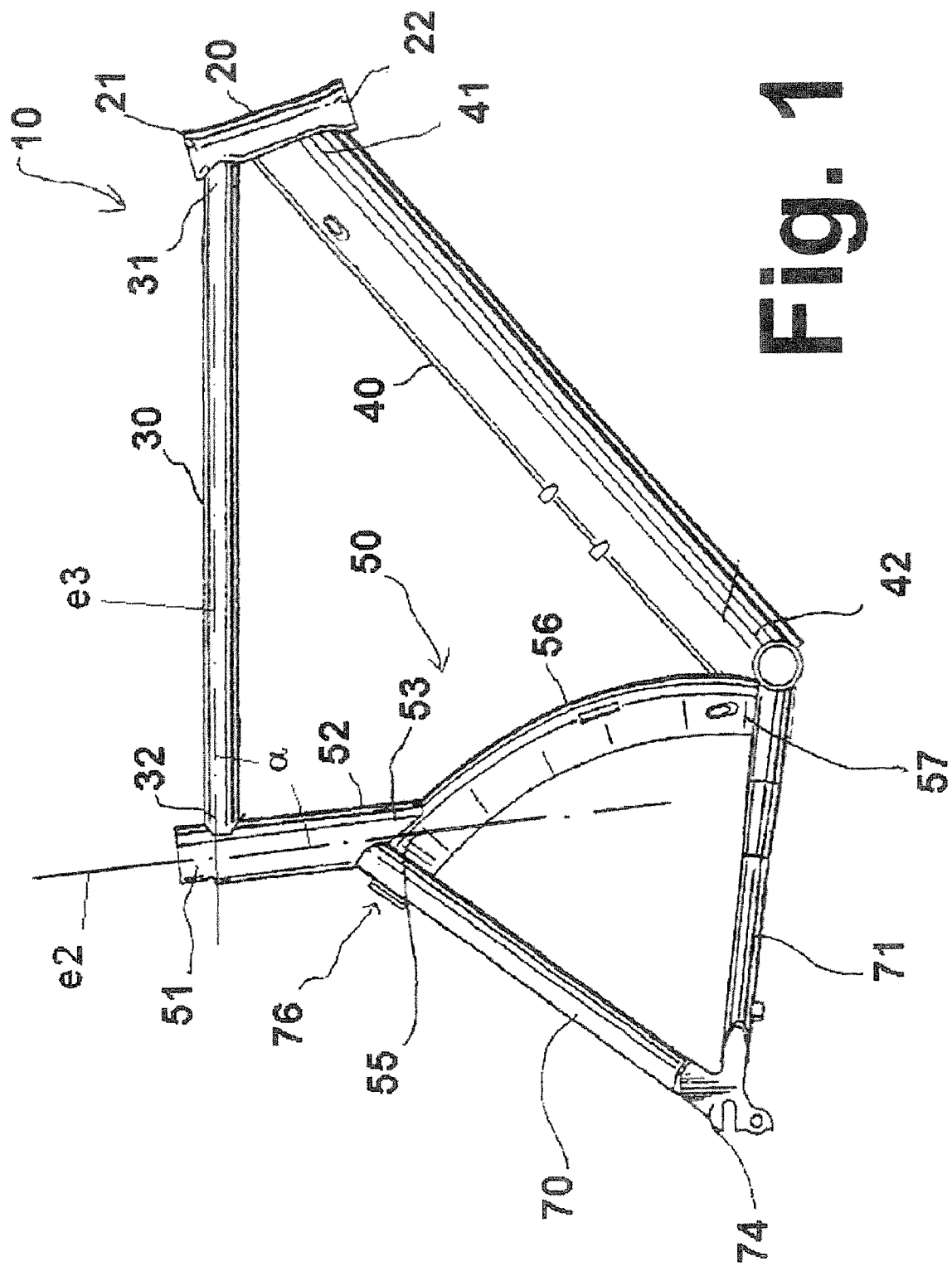
FIG. 1 is a schematic representation of a bicycle frame which forms part of the modern state of the technique (according to Patent US20040046352) in which the angle ($\alpha$) between tubulars (30), (51 has been indicated).
Figure 2:
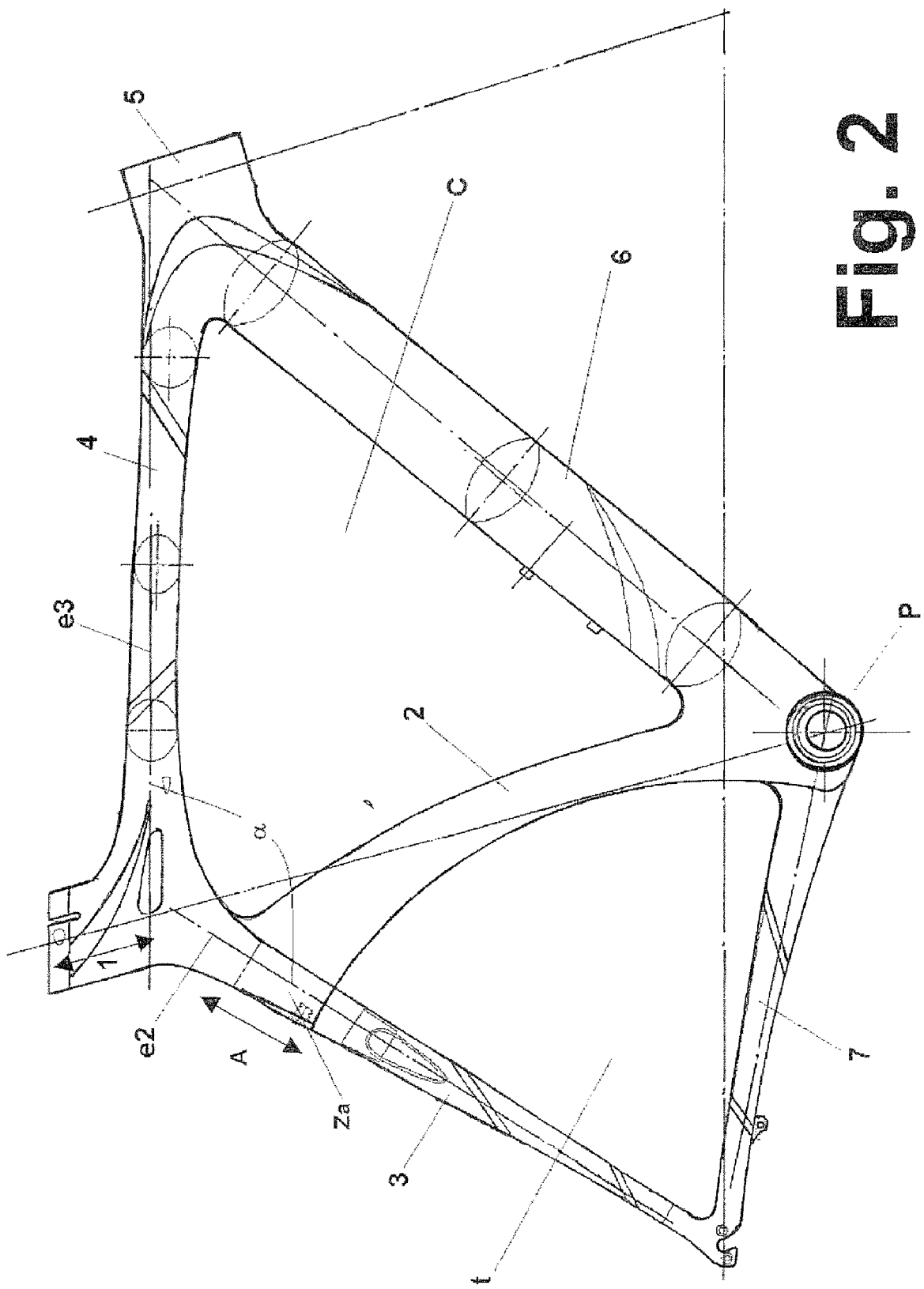
FIG. 2 is s schematic representation of a bicycle frame according to the invention.
Figure 3:
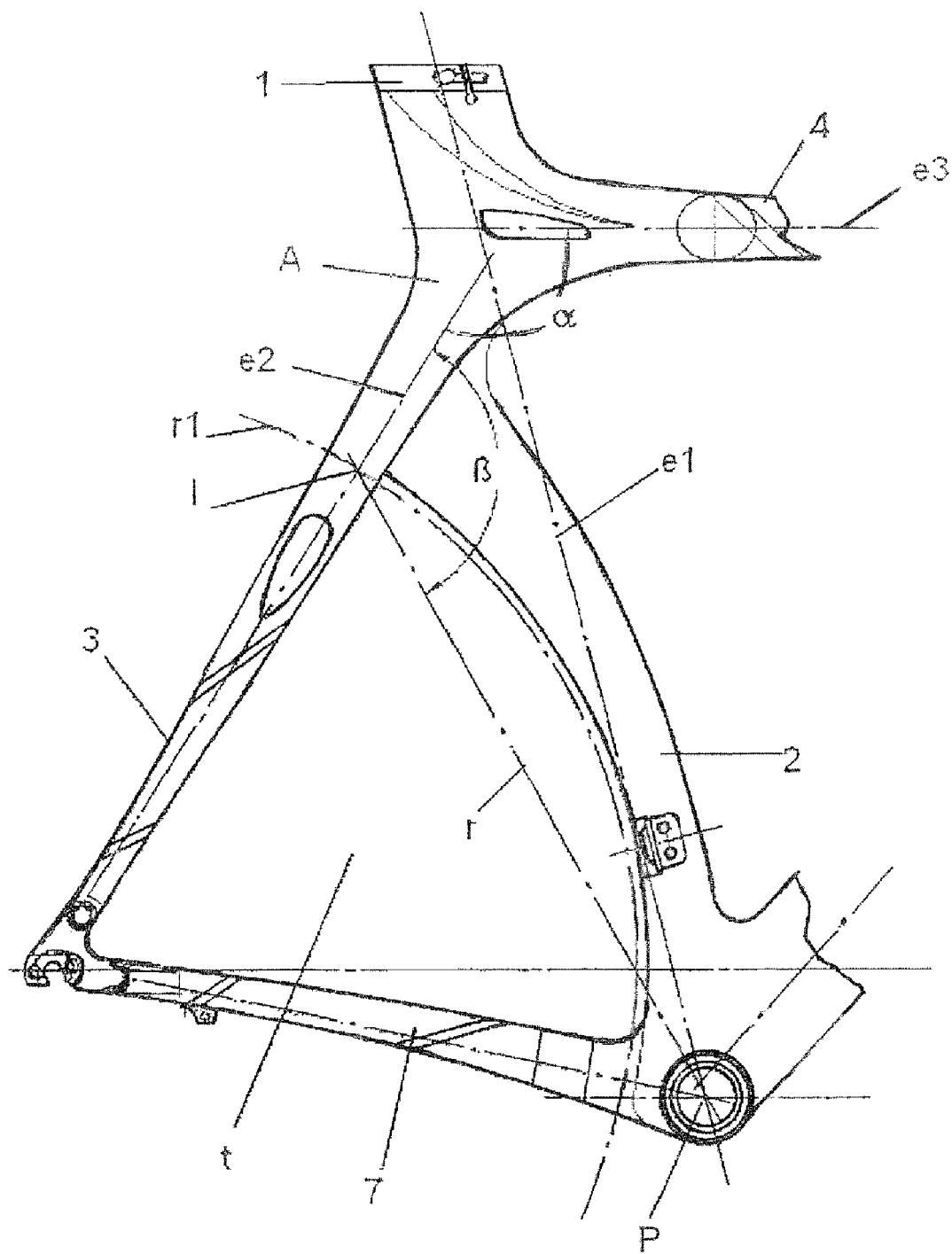
FIG. 3 is a partial view of FIG. 2, in which the coupling angle ($\beta$) has also been indicated.

An example of practical, non-limiting implementation of this invention is described as follows:

The object of the invention is a new bicycle frame manufactured in a single composite piece (carbon-compound material) in which (see FIG. 2) a rear triangle (t) and a front quadrilateral (c) of tubular elements are clearly delimited.

The front quadrilateral (c) consists of a head tube (5), to which is joined an upper tube (4) which is approximately horizontal, a lower slanted tube (6) and a sealing element (2). The sealing element (2) is joined below to the slanted tube (6), to place the pedals (P) in this zone of union, and is joined in the upper part to the lower zone ($Z_A$) of a coupling element (A).

The coupling element (A) is joined in the upper part to the upper tube (4) and below with the braces (3), which form a part of the rear triangle (t). In the zone of union of the coupling element (A) with the upper tube (4) is placed the saddle tube (1), the shaft ($e_1$) of which passes through the centre of the pedals (P).

The rear triangle (t) consists of said upper braces (3), of lower braces (7) and the sealing element itself (2)—which is common to the rear triangle (t) and the front quadrilateral (C)—.

The sealing element (2) is curved and covers the rear wheel of the bicycle.

The shaft ($e_2$) of the coupling element (A) is approximately coplanar with the shaft of the upper braces (3) and forms a comfort angle (a) with the shaft ($e_3$) of the upper tube (4). This angle (a) is always the same or greater than 120° which allows it to absorb vibrations.

The shaft ($e_2$) of the coupling element (A) and the straight line (r) which joins the centre of the pedals (P) with the intersection point (l) between said shaft ($e_2$) with the internal arc ($r_1$) of said sealing element (2) form between them a coupling angle ($\beta$). This coupling angle ($\beta$) is variable depending on the size, the keep constant the ratio rigidity-absorption/damping of vibrations regardless of the weight and size of the cyclist.

The coupling angle ($\beta$) has a value between 120° and 140°: $120 = (\beta) = 140$.

With this coupling angle ($\beta$) the functions of the comfort angle ($\alpha$) of absorption of vibrations and pleasant feeling in operation and pedalling by the user, are complemented.

The bicycle frame of the invention can be described as follows, a bicycle frame, characterized because it consists of a rear triangle (t) joined to a front quadrilateral (c) of tubular elements, the front quadrilateral (c) consisting of a head tube (5) joined to an upper tube (4) which is approximately horizontal and a lower slanted tube (6); a sealing element (2) which is joined below to the lower tube (6) and to place the pedals (P) above a coupling element (A), which is joined above with the upper tube (4) the rear triangle (t) consisting of upper braces (3), lower braces (7) and a sealing element (2), which is curved and covers the rear wheel of the bicycle, the shaft ($e_2$) being of the coupling element (A) approximately coplanar with the shaft of the upper braces (3) forming an angle of comfort (a) with respect to the shaft of the upper tube (4) of an equal value to or greater than 120°: a =120°.

Preferably, the frame is characterized because in the zone of union of the coupling element to the upper tube (4) there is a saddle tube (1) the shaft ($e_1$) of which passes through the centre of the pedals(P).

Also, preferably the frame is characterized because the shaft ($e_2$) of the coupling element (A) and the straight line (r) which joins the centre of the pedal case (P) and the intersection point (1) between said shaft ($e_2$) to the internal arc of said sealing element (2) together form a coupling angle ($\beta$).

Furthermore, the frame is preferably characterized because the comfort angle (a) and the coupling angle ($\beta$) are variable, depending on the size, by approximately 5° to keep the ratio of rigidity-absorption/damping of vibrations constant regardless of the weight and size of the cyclist.

More preferably, the frame is a single-block composite.

The invention claimed is:
1. A bicycle frame comprising:
   (a) a front quadrilateral of tubular elements, the front quadrilateral having
      (i) a horizontal upper tube joined at one end to a head tube,
      (ii) a slanted lower tube joined at one end to the head tube and having a pedal attachment point at the other end of the slanted lower tube, and
      (iii) a sealing element joined at one end to the other end of the slanted lower tube, the sealing element curved for covering a rear wheel of a bicycle;
   (b) a rear triangle of tubular elements, the rear triangle having
      (i) a lower brace joined at one end to the other end of the slanted lower tube,
      (ii) an upper brace joined at one end to the other end of the lower brace, and
      (iii) the sealing element joined at the other end to the other end of the upper brace;
   (c) a coupling element joined to the other end of the horizontal upper tube and to other end of the upper brace to form a joint between the horizontal upper tube and the upper brace, an axis of the joint between the coupling element and the upper brace approximately coplanar with an axis of the upper brace;
   (d) a seat tube projecting outward from the joint between the coupling element and the upper tube, the seat tube having an axis which intersects the center of the pedal attachment point;
   (e) a comfort angle between an axis of the horizontal upper tube and the axis of the upper brace is greater than or equal to 120; and
   (f) the frame is a single piece manufactured of carbon-compound material.
2. The frame of claim 1, wherein
   a coupling angle between the axis of the upper brace and a line formed between the pedal attachment point and an intersection point, the intersection point defined as an intersection between an arc formed by the sealing element and the axis of the upper brace being between 120° and 140°.

* * * * *